(12) United States Patent
Huang et al.

(10) Patent No.: US 12,736,146 B2
(45) Date of Patent: Sep. 15, 2026

(54) PRESSURE REGULATING VALVE STRUCTURE

(71) Applicant: Intex Marketing Ltd., Tortola (VG)

(72) Inventors: Zhi Xiong Huang, Fujian (CN); Ying Biao Zhang, Fujian (CN); Zhi Wen Zhou, Fujian (CN)

(73) Assignee: Intex Marketing Ltd., Tortola (VG)

( * ) Notice: Subject to any disclaimer, the term of this patent is extended or adjusted under 35 U.S.C. 154(b) by 0 days.

(21) Appl. No.: 18/853,336

(22) PCT Filed: Mar. 30, 2023

(86) PCT No.: PCT/IB2023/053209

§ 371 (c)(1),
(2) Date: Oct. 1, 2024

(87) PCT Pub. No.: WO2023/187721

PCT Pub. Date: Oct. 5, 2023

(65) Prior Publication Data

US 2025/0224746 A1 Jul. 10, 2025

(30) Foreign Application Priority Data

Apr. 2, 2022 (CN) ......................... 202220773155.9

(51) Int. Cl.
*F16K 15/20* (2006.01)

(52) U.S. Cl.
CPC .................................. *F16K 15/207* (2013.01)

(58) Field of Classification Search
CPC .. F16K 15/207; F16K 31/126; F16K 31/1268; F16K 31/165; F16K 31/365; G05D 16/0683; G05D 16/101
See application file for complete search history.

(56) References Cited

U.S. PATENT DOCUMENTS 2,580,866 A * 1/1952 Waterman .......... G05D 16/0683 251/211
2,651,328 A * 9/1953 Gamble ............. G05D 16/0683 92/100
3,080,853 A * 3/1963 Puster .................. G05D 23/185 91/47

(Continued)

FOREIGN PATENT DOCUMENTS

JP S62158152 10/1987
KR 20110040485 4/2011

OTHER PUBLICATIONS

International Search Report and Written Opinion issued by the International Searching Authority, dated Jul. 14, 2023, for International Patent Application No. PCT/IB2023/053209; 14 pages.

(Continued)

*Primary Examiner* — Umashankar Venkatesan
(74) *Attorney, Agent, or Firm* — Faegre Drinker Biddle & Reath LLP

(57) ABSTRACT

A pressure regulating valve structure is described. The pressure regulating valve structure may include a valve body, an air inlet channel arranged in the valve body, and a valve stem movably arranged in the air inlet channel and configured to open or close the air inlet channel. In normal conditions, the air inlet channel is open.

38 Claims, 12 Drawing Sheets

(56) References Cited

U.S. PATENT DOCUMENTS

| | | | | |
|---|---|---|---|---|
| 3,421,732 | A * | 1/1969 | Golden | F16K 11/24 92/99 |
| 3,490,342 | A * | 1/1970 | Reis | G05D 16/0683 200/83 A |
| 5,131,425 | A * | 7/1992 | Sturgis | G05D 16/0683 137/505.46 |
| 5,520,211 | A * | 5/1996 | Schonstein | F17C 13/04 137/340 |
| 11,261,975 | B2 * | 3/2022 | Mann, III | F16K 3/22 |
| 12,147,250 | B2 * | 11/2024 | Armesto-Beyer | G05D 16/0691 |
| 2007/0074760 | A1 * | 4/2007 | Wu | F16K 15/063 5/706 |
| 2008/0258098 | A1 | 10/2008 | Hawkins | |
| 2021/0317923 | A1 | 10/2021 | Heberling | |

OTHER PUBLICATIONS

International Preliminary Report on Patentability issued by the International Searching Authority, dated Oct. 8, 2024, for International Patent Application No. PCT/IB2023/053209; 8 pages.

* cited by examiner

PRESSURE REGULATING VALVE STRUCTURE

RELATED APPLICATIONS

The present application is a national stage entry of International (PCT) Patent Application Number PCT/IB2023/053209, filed Mar. 30, 2023, which claims priority to Chinese Application No. CN202220773155.9, filed Apr. 2, 2022, the entire disclosures of which are expressly incorporated herein by reference.

FIELD OF THE DISCLOSURE

The present invention relates to a valve structure, in particular to a pressure regulating valve structure.

BACKGROUND OF THE DISCLOSURE

Pressure regulating valves are commonly used in inflatable products. A conventional pressure regulating valve is generally equipped with a spring, which is normally closed. When inflating the inflatable product through the pressure regulating valve, it is necessary to overcome the spring force to open the regulating valve and then inflate the inflatable product. This leads to low efficiency and long inflation time of inflatable products. Improvements on the foregoing are desired.

SUMMARY OF THE DISCLOSURE

The present disclosure provides a pressure regulating valve structure, which can improve the inflation efficiency of inflatable products.

In one form thereof, the present disclosure provides a pressure regulating valve structure comprising a valve body, an air inlet channel arranged in the valve body, and a valve stem movably arranged in the air inlet channel and configured to open or close the air inlet. The air inlet channel may be in an open state under normal conditions. The valve stem may be connected to a linkage rod. The linkage rod may be connected to a pressure valve diaphragm, and the pressure valve diaphragm may be installed on the valve body. A closed compression space may be formed between the pressure valve diaphragm and the valve body, and the compression space may be connected with an outside of the valve body.

In another form thereof, a first end of the linkage rod may be hinged on the valve body, and a second end may be connected to the pressure valve diaphragm.

In another form thereof, the valve stem may be directly connected to the linkage rod.

In another form thereof, the valve stem may be connected to the linkage rod through an elastic member.

In another form thereof, the linkage rod may be provided with a rotatable adjusting bolt, a first end of the elastic member may be connected to a valve stem, and a second end may be connected to the adjusting bolt.

In another form thereof, the pressure valve diaphragm may be fixed on the main body through a fixing member.

In another form thereof, the linkage rod may be connected to at least two pressure valve diaphragms. The at least two pressure valve diaphragms may be arranged at equal intervals on the same circumference, and the connecting point between the linkage rod and the valve stem may be located inside the circumference formed by the at least two pressure valve diaphragms.

In another form thereof, the valve body may be provided with a first joint and a second joint, the first joint may be connected to the air inlet channel, and the second joint may be connected to the compression space.

In another form thereof, the valve stem may be matched with a sealing valve diaphragm.

In another form thereof, the valve body may be further provided with an air outlet channel, and the air outlet channel may be equipped with at least one sealing gasket. When an air pressure at the inner side of the air outlet channel is greater than an air pressure at the outer side of the air outlet channel, the sealing gasket may open the air outlet channel. When the air pressure at the outer side of the air outlet channel is greater than the air pressure at the inner side of the air outlet channel, the sealing gasket may close the air outlet channel. The inner side may be positioned proximate the side of the valve body toward the inflatable product, and the outer side may be positioned opposite the inner side.

In another form thereof, the air outlet channel may be equipped with more than one sealing gasket.

In another form thereof, the valve body may comprise a body and an upper cover, and the upper cover and the main body may form the air outlet channel.

In another form thereof, the pressure control valve structure may be installed on an outer wall of the inflatable product.

In another form thereof, the inflatable product may be a single chamber inflatable product.

In another form thereof, the inflatable product may be a multi-chamber inflatable product, and the inflatable product may be equipped with an inflation and deflation component. The inflation and deflation component may be arranged on the outer wall of the inflatable product and connected with one of the chambers, and an outer wall of each respective chamber may be equipped with the pressure control valve structure. The air inlet channel of the pressure control valve structure may be communicated with the inflation and deflation component, and the compression space is communicated with the outside of the inflatable product.

In another form thereof, the inflation and deflation components are inflation and deflation valves or inflation and deflation pumps.

In another form thereof, a pressure regulating valve structure may comprise a valve body, a linkage rod, a valve stem, and a pressure valve diaphragm. The valve body may comprise an air inlet channel, an air outlet channel, and a compression space fluidly connected to an outside of the valve body. The linkage rod may be pivotally connected to the valve body. The valve stem may be movably positioned within the air inlet channel and connected to the linkage rod. The pressure valve diaphragm may be indirectly connected to the valve stem via the linkage rod and configured to displace within the compression space.

In another form thereof, the valve stem may be in an open position within the air inlet channel under a normal condition.

In another form thereof, the pressure regulating valve structure may further comprise an elastic member. The elastic member may be positioned between the valve stem and the linkage rod such that the valve stem is indirectly connected to the linkage rod via the elastic member.

In another form thereof, the linkage rod may further comprise an adjusting bolt, a first end of the elastic member may be connected to the valve stem, and a second end of the elastic member may be connected to the adjusting bolt.

In another form thereof, the linkage rod may comprise a first end and a second end, the linkage rod may be pivotally connected to the valve body proximate the first end, and the pressure valve diaphragm may be connected to the linkage rod proximate the second end.

In another form thereof, a pressure regulating valve structure may comprise a valve body, a linkage rod, a valve stem, and a plurality of pressure valve diaphragms. The valve body may comprise an air inlet channel, an air outlet channel, and a plurality of compression spaces fluidly connected to an outside of the valve body. The linkage rod may be movably connected to the valve bod. The valve stem may be movably positioned within the air inlet channel and connected to the linkage rod. The plurality of pressure valve diaphragms may be connected to the linkage rod, and each of the plurality of pressure valve diaphragms may be positioned within a respective compression space of the plurality of compression spaces. The plurality of pressure valve diaphragms may collectively define a circumference having a central longitudinal axis coincident with a longitudinal axis of the valve stem.

In another form thereof, the plurality of pressure valve diaphragms may be arranged at equal intervals about the circumference.

The present disclosure provides a pressure regulating valve structure that may comprise a valve stem movably arranged in an air inlet channel of a valve body, and the air inlet channel is opened under normal conditions through the mutual coordination of the valve stem, a linkage rod, and a pressure valve diaphragm so that the inflatable product can be directly inflated without overcoming the resistance of, for example, an elastic member that biases the valve to a closed position during inflation, thereby improving the inflation efficiency and realizing the rapid inflation of an inflatable product. After the air pressure in the inflatable product reaches the set value, the pressure valve diaphragm compresses into a compression space, and the linkage rod moves with the pressure valve diaphragm to drive the valve stem to close the air inlet channel, which further ensures the pressure limiting effect of the pressure regulating valve. That is to say, the present pressure regulating valve structure can realize rapid inflation of inflatable products on the basis of realizing pressure limitation.

Additional features and advantages of the present disclosure will become apparent to those skilled in the art upon consideration of the following detailed description.

Figure 1:
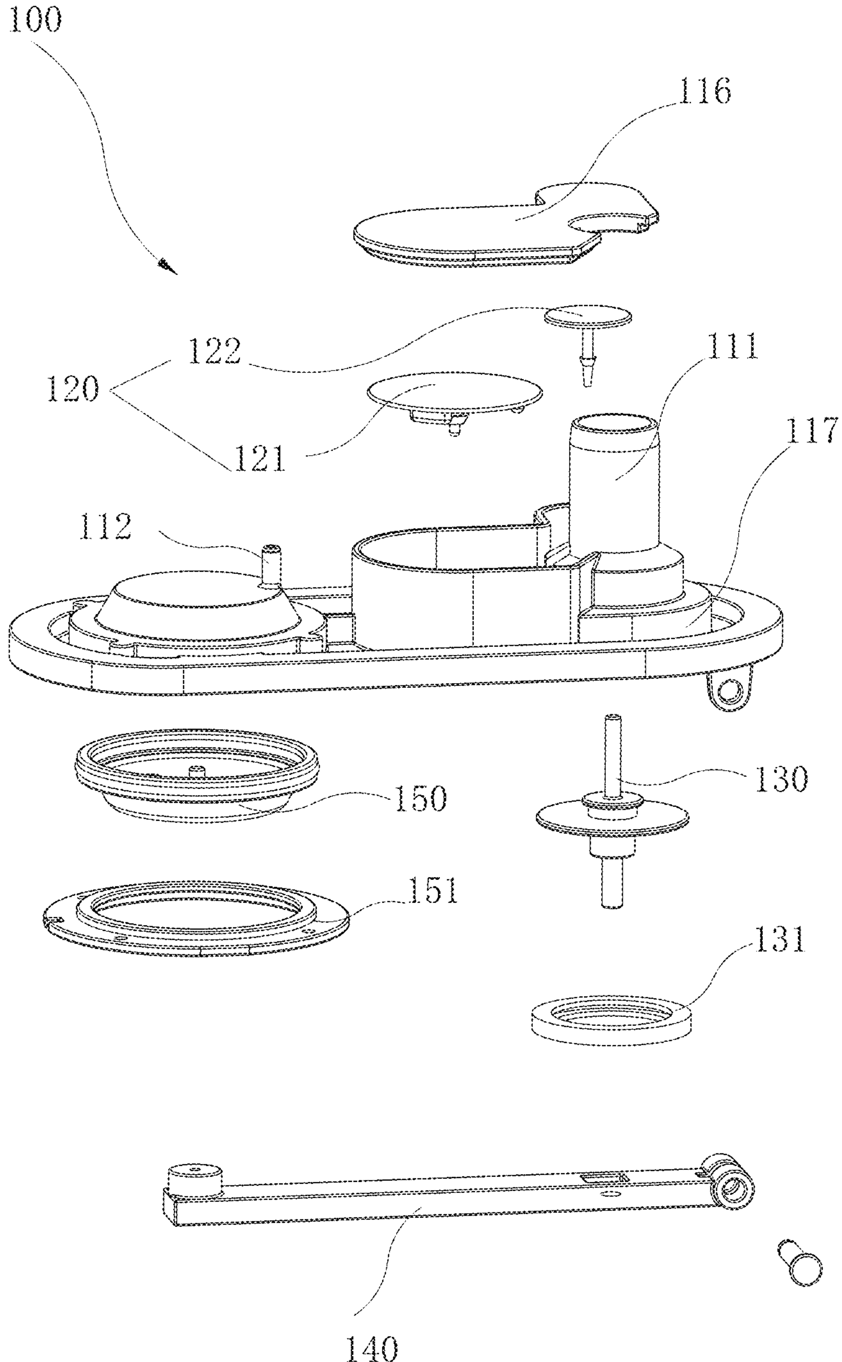
FIG. 1 is an exploded view of a pressure regulating valve structure according to a first embodiment of the present disclosure.
Figure 2:
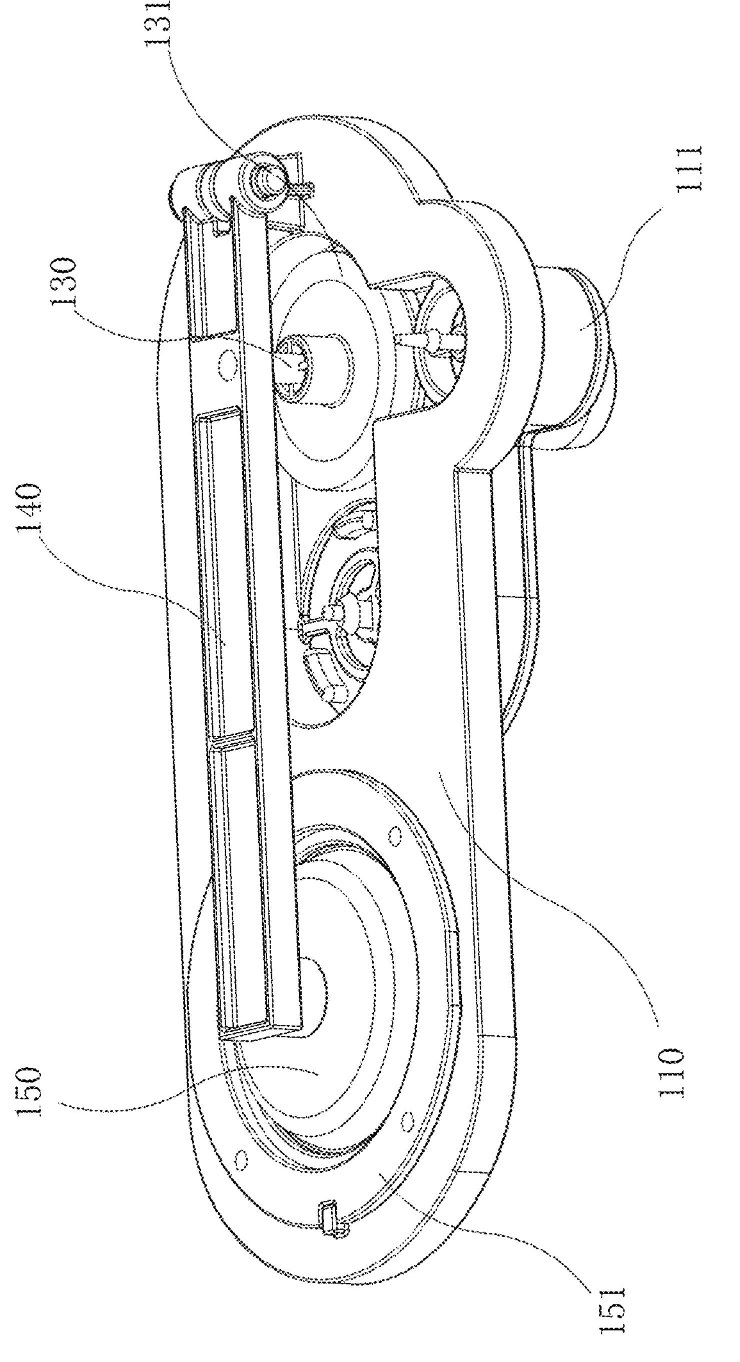
FIG. 2 is a perspective view of the pressure regulating valve structure of FIG. 1.
Figure 3:
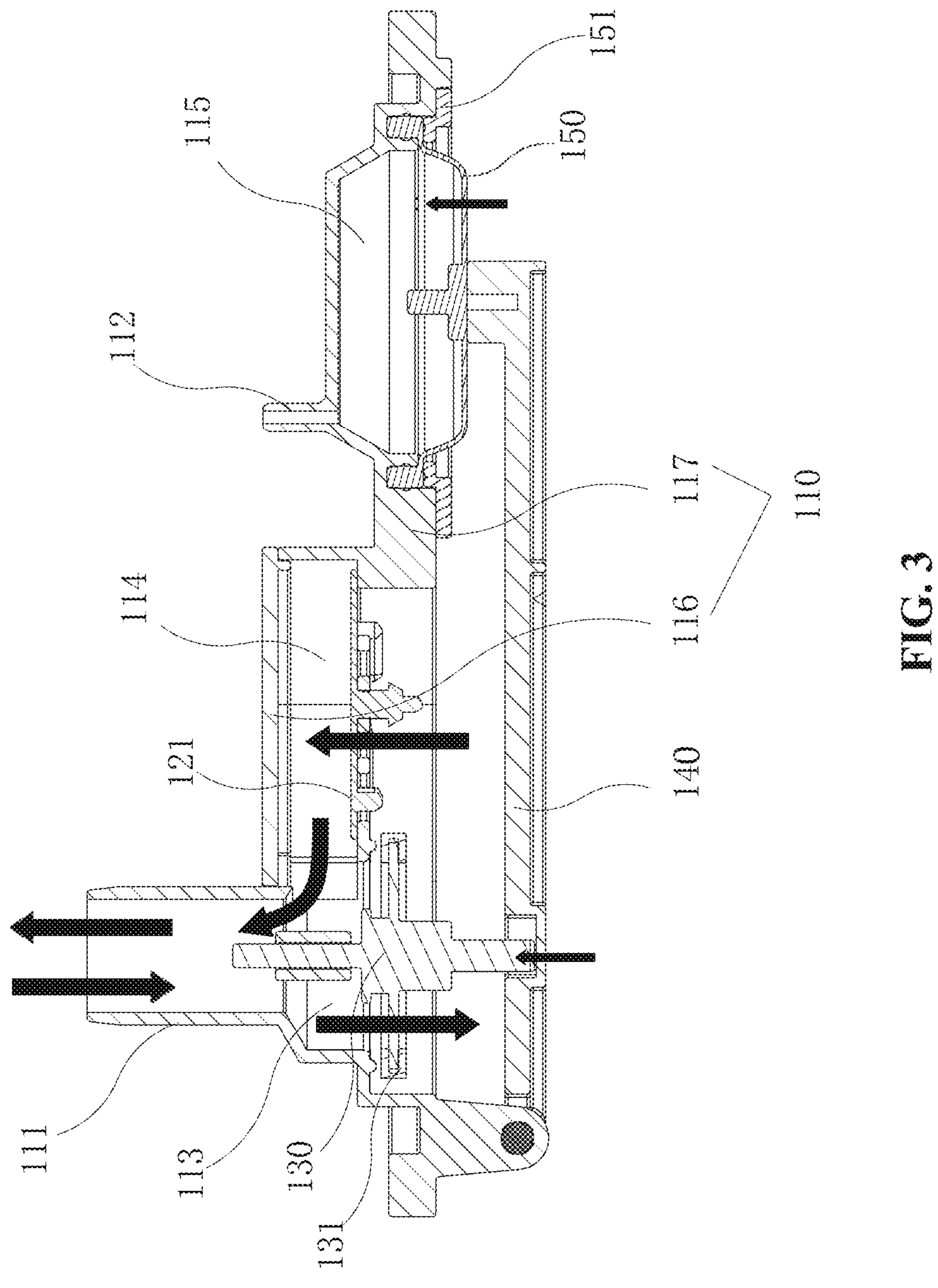
FIG. 3 is a sectional view of the pressure regulating valve structure of FIG. 1.
Figure 4:
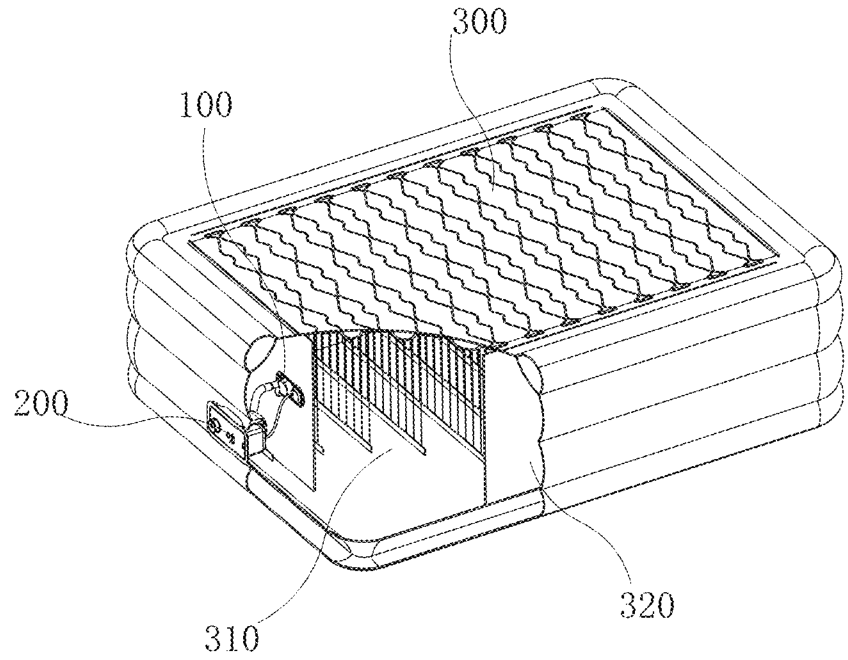
FIG. 4 is a perspective view of pressure regulating valve structure of FIG. 1, the pressure regulating valve structure shown disposed in an inflatable product.
Figure 5:
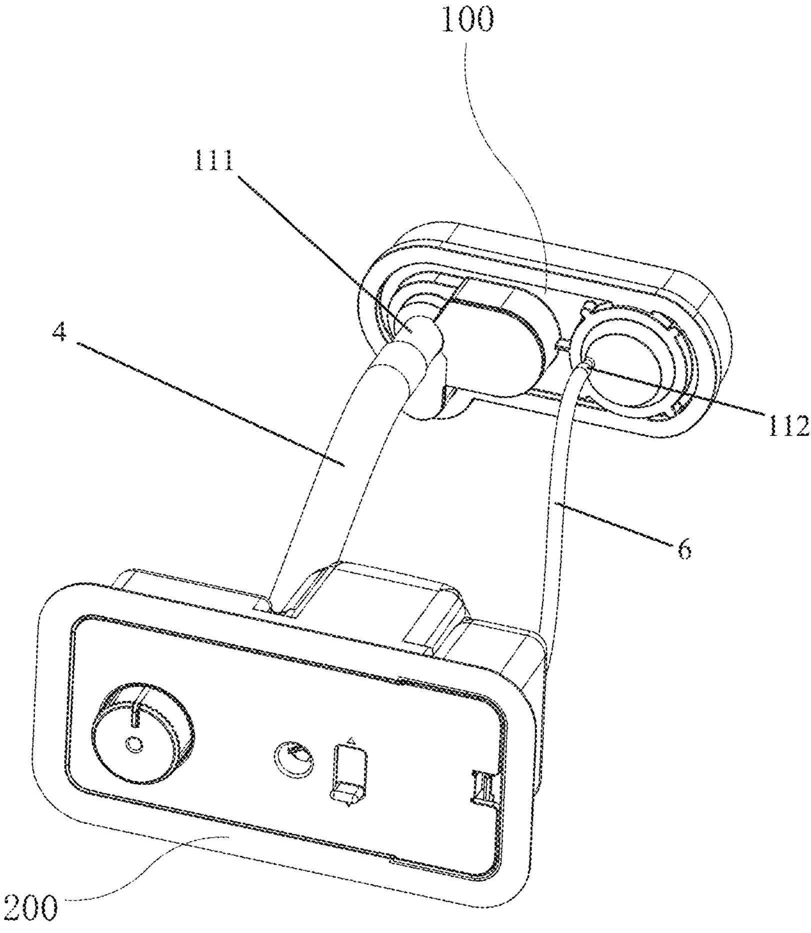
FIG. 5 is a perspective view of the pressure regulating valve structure of FIG. 1 connected to an air pump.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

DETAILED DESCRIPTION OF THE EMBODIMENTS

The present application is described in further detail below with the accompanying drawings and embodiments. The specific embodiments described herein are intended only to explain the present application and not to limit it. It is also to be noted that, for ease of description, only those portions related to the application are shown in the accompanying drawings.

It is to be noted that the embodiments and the features in the embodiments of the present application can be combined with each other when not conflicting. The present application will be described in detail below with reference to the accompanying drawings and in connection with the embodiments.

As shown in FIGS. 1-12, the present disclosure provides a pressure regulating valve structure, which comprises a valve body 110 in which an air inlet channel 113 is arranged. A valve stem 130 for opening or closing the air inlet channel 113 is movably mounted in the air inlet channel 113, and, under normal conditions, the air inlet channel 113 is in an open state. The valve stem 130 is connected to a linkage rod 140, and the linkage rod 140 is connected to a pressure valve diaphragm 150, which is installed on the valve body 110. A closed compression space 115 is formed between the pressure valve diaphragm 150 and the valve body 110, and the compression space 115 is externally connected with the valve body 110.

The valve stem 130 is movably mounted in the air inlet channel 113 of the valve body 110 and opens the air inlet channel 113 under normal conditions through the mutual coordination of the valve stem 130, the linkage rod 140, and the pressure valve diaphragm 150. Accordingly, the inflatable product can be directly inflated without needing to overcome a resistance of a biasing member, such as an elastic member, that biases the valve closed in normal conditions, thereby improving the inflation efficiency and realizing the rapid inflation of the inflatable product.

After the air pressure in the inflatable product reaches the set value, the pressure valve diaphragm 150 compresses within the compression space 115, and the linkage rod 140 moves with the valve diaphragm 150 to drive the valve stem 130 to close the air inlet channel 113, which further ensures the pressure limiting effect of the pressure regulating valve. That is to say, the present invention can realize rapid inflation of inflatable products on the basis of realizing pressure limitation.

To elaborate the content of the present invention, four embodiments are listed below for exemplary purposes.

Embodiment 1

As shown in FIGS. 1-5, a pressure regulating valve structure is provided with a valve body 110. The valve body 110 is provided with a first joint 111 and a second joint 112, and the valve body 110 is further provided with an air inlet channel 113 connected with the first joint 111 and an air outlet channel 114. The air outlet channel 114 is equipped with a sealing gasket 120. When the air pressure at the inner side of the air outlet channel 114 is greater than the air pressure at the outer side of the air outlet channel, the sealing gasket 120 opens the air outlet channel 114. When the air pressure at the outer side of the air outlet channel 114 is greater than the air pressure at the inner side, the sealing gasket 120 closes the air outlet channel 114. The air inlet channel 113 is movably equipped with a valve stem 130, which can open or close the air inlet channel 113. The valve stem 130 is equipped with a sealing member 131, and the inner end of the valve stem 130 is connected to a linkage rod 140. One end of the linkage rod 140 is pivotally connected to the valve body 110, and the other end is connected to a pressure valve diaphragm 150. The pressure valve diaphragm 150 is installed on the valve body 110, and a closed compression space 115 is formed between the pressure valve and the valve body 110. The compression space 115 is connected to the second joint 112. As used herein, the inner side refers to the side of the valve body 110 toward the inflatable product, and the outer side refers to the side opposite the inner side.

The valve stem 130 is directly connected with the linkage rod 140. When the pressure regulating valve 100 is installed in the inflatable product for use, and when the inflatable product is not inflated, there is a gap between the sealing member 131 on the valve stem 130 and the valve body 110. However, during the inflation process, with the increase of the internal pressure in the inflatable product, the gap between the sealing member 131 and the valve body 110 gradually closes.

The regulating valve 100 can be assembled in single-chamber inflatable products or multi-chamber inflatable products and can be used with single-channel inflating devices or dual-channel inflating devices. As an example, a multi-chamber inflatable product that includes the regulating valve 100 is shown and described in detail together with a dual-channel inflation and deflation pump 200.

The inflatable product 300 comprises an inner chamber 310 and an outer chamber 320. An inflation and deflation pump 200 is installed on the side wall of the outer chamber 320, and a pressure regulating valve 100 is installed on the side wall of the inner chamber 310. The first joint 111 of the regulating valve 100 is connected with the inflation and deflation joint of the inflation and deflation pump 200 via first joint conduit 4. The inflation and deflation joint is further connected with the outer chamber 320. The second joint 112 of the regulating valve 100 is connected with outer side of the inflatable product 300 via second joint conduit 6. The first and second joint conduits 4, 6 span the outer chamber 320.

When inflating the inflatable product 300, open both channels of the inflation and deflation pump 200 and start the inflation and deflation pump 200 for inflating. The external air will enter the outer chamber 320 and enter the inner chamber 310 through the first joint 111 and the air inlet channel 113. When the inner chamber 310 reaches a certain pressure value, the pressure valve diaphragm 150 will move toward the compression space 115, driving the linkage rod 140 to move outward, and then driving the valve stem 130 to move outward. The gap between the sealing member 131 on the valve stem 130 and the valve body 110 closes, and the inflation can be stopped.

If the air pressure of the outer chamber 320 is required to be greater than that of the inner chamber 310, at this time, the air passage connected between the inflation and deflation pump 200 and the inner chamber 310 can only be open to deflate to adjust the air pressure of the inner chamber 310. The inflation and deflation pump 200 absorbs air from the first joint 111, the sealing gasket 120 is opened, and the inner chamber 310 deflates, the pressure value in the inflatable product is reduced.

The valve body 110 comprises a main body 117 and an upper cover 116. The pressure valve diaphragm 150 is fixed on the main body 117 through a fixing member 151. The upper cover 116 and the main body 117 form the air outlet channel 114. To speed up the air release, the number of gaskets 120 is set to two, namely, the large gasket 121 and the small gasket 122.

Embodiment 2

Figure 6:
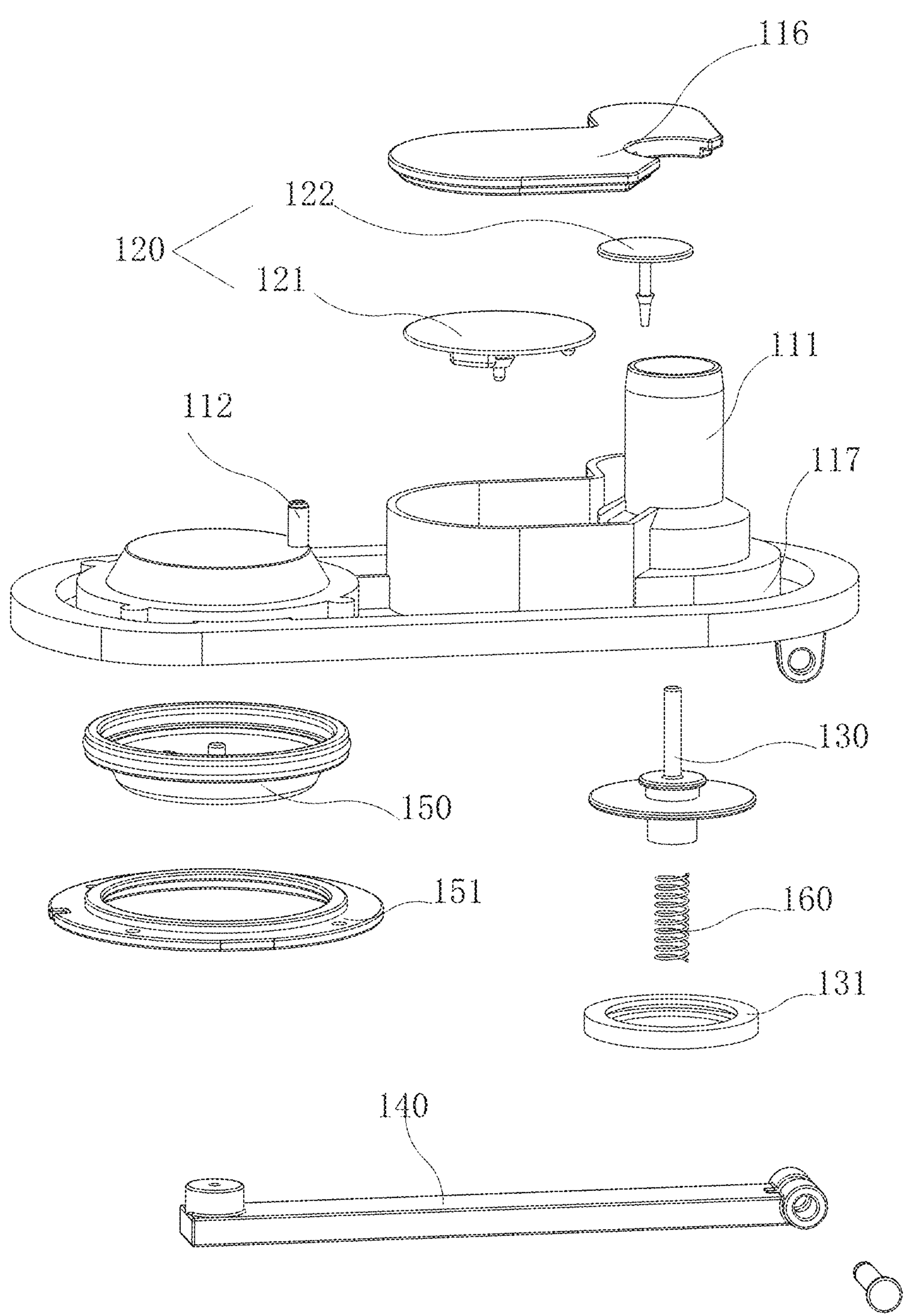
FIG. 6 is an exploded view of a pressure regulating valve structure according to a second embodiment of the present disclosure.
Figure 7:
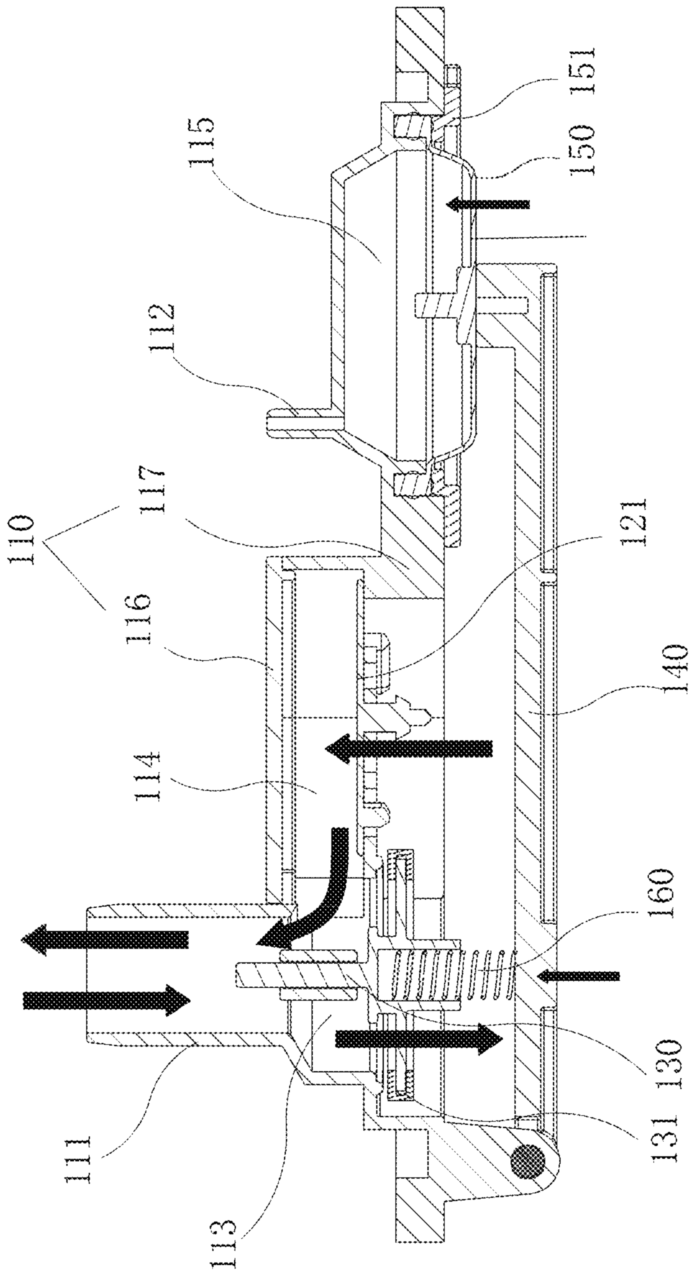
FIG. 7 is a sectional view of the pressure regulating valve structure of FIG. 6.

The pressure regulating valve depicted in FIGS. 6 and 7 is similar to the pressure regulating valve of Embodiment 1, except as provided herein. As illustrated in FIGS. 6 and 7, the pressure regulating valve includes an elastic member 160 configured to slow down the closing of the sealing member 131 of the valve stem 130 within the air inlet channel 113.

Specifically, the valve stem 130 is connected to the linkage rod 140 through elastic member 160. The elastic member 160 is a spring, and one end of the spring is connected to the valve stem 130, and the other end is connected to the linkage rod 140.

When the pressure regulating valve is applied to the inflatable product 300, if the sealing member 131 on the valve stem 130 is to seal the air inlet channel 113, it is not only necessary to overcome the thrust of the pressure valve diaphragm 150 to drive the valve stem 130 to move after compression, but further to overcome the spring force of elastic member 160. Thus, greater pressure in, for example, inner chamber 310 may be required to place sealing member 131 in sealing engagement with the air inlet channel 113.

Embodiment 3

Figure 8:
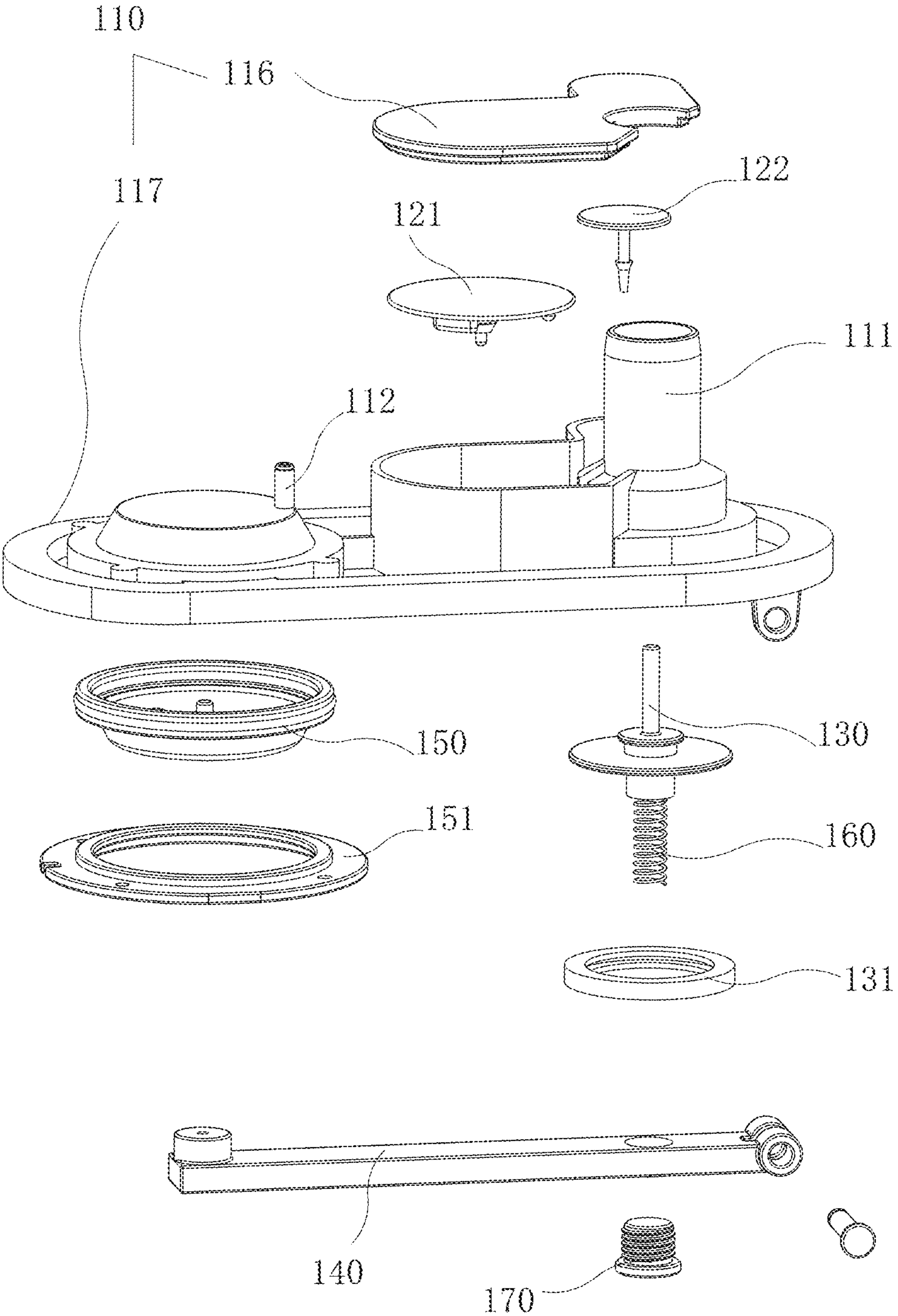
FIG. 8 is an exploded view of a pressure regulating valve structure according to a third embodiment of the present disclosure.
Figure 9:
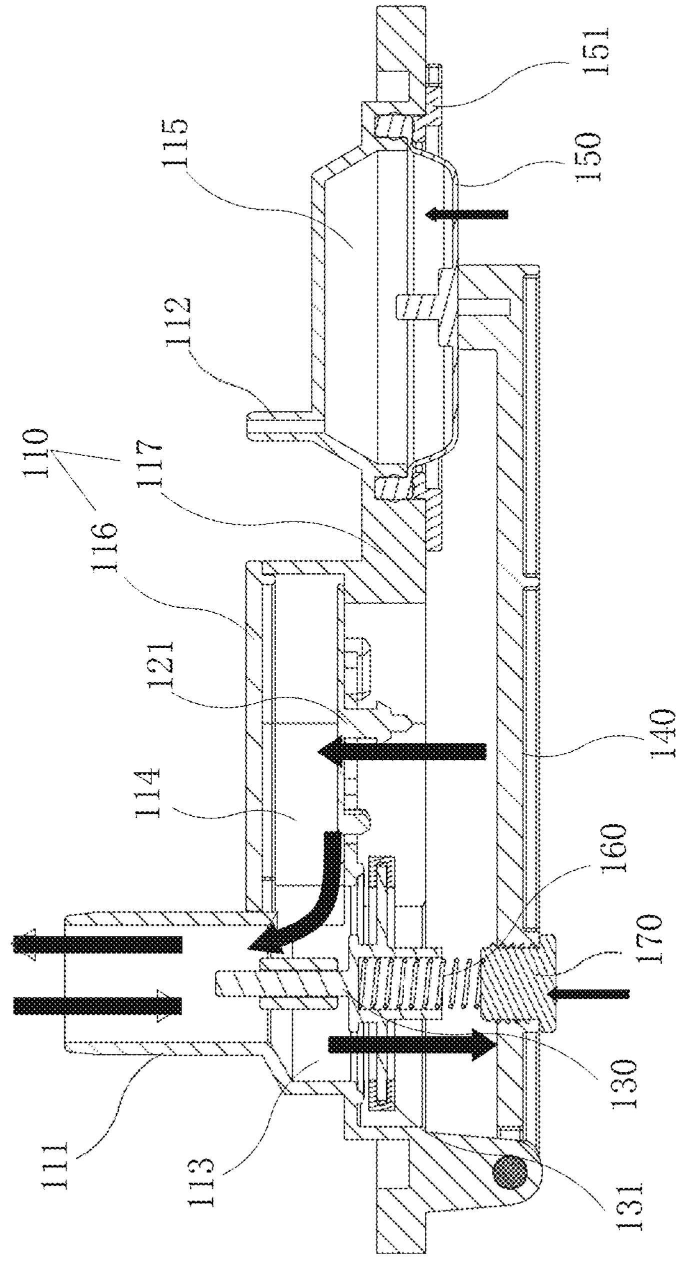
FIG. 9 is a sectional view of the pressure regulating valve structure of FIG. 8.

The pressure regulating valve depicted in FIGS. 8 and 9 is similar to the pressure regulating valve of Embodiments 1 and 2. However, the pressure regulating valve illustrated in FIGS. 8 and 9 is further provided with an adjusting bolt 170. The adjusting bolt 170 is rotatably arranged on the linkage rod 140. One end of the elastic member 160 is connected to the valve stem 130, and the other end is connected with the adjusting bolt 170.

When the pressure regulating valve is applied to the inflatable product 300, the adjusting bolt 170 can be adjusted according to the actual use, so as to change the biasing force of the spring.

Embodiment 4

Figure 10:
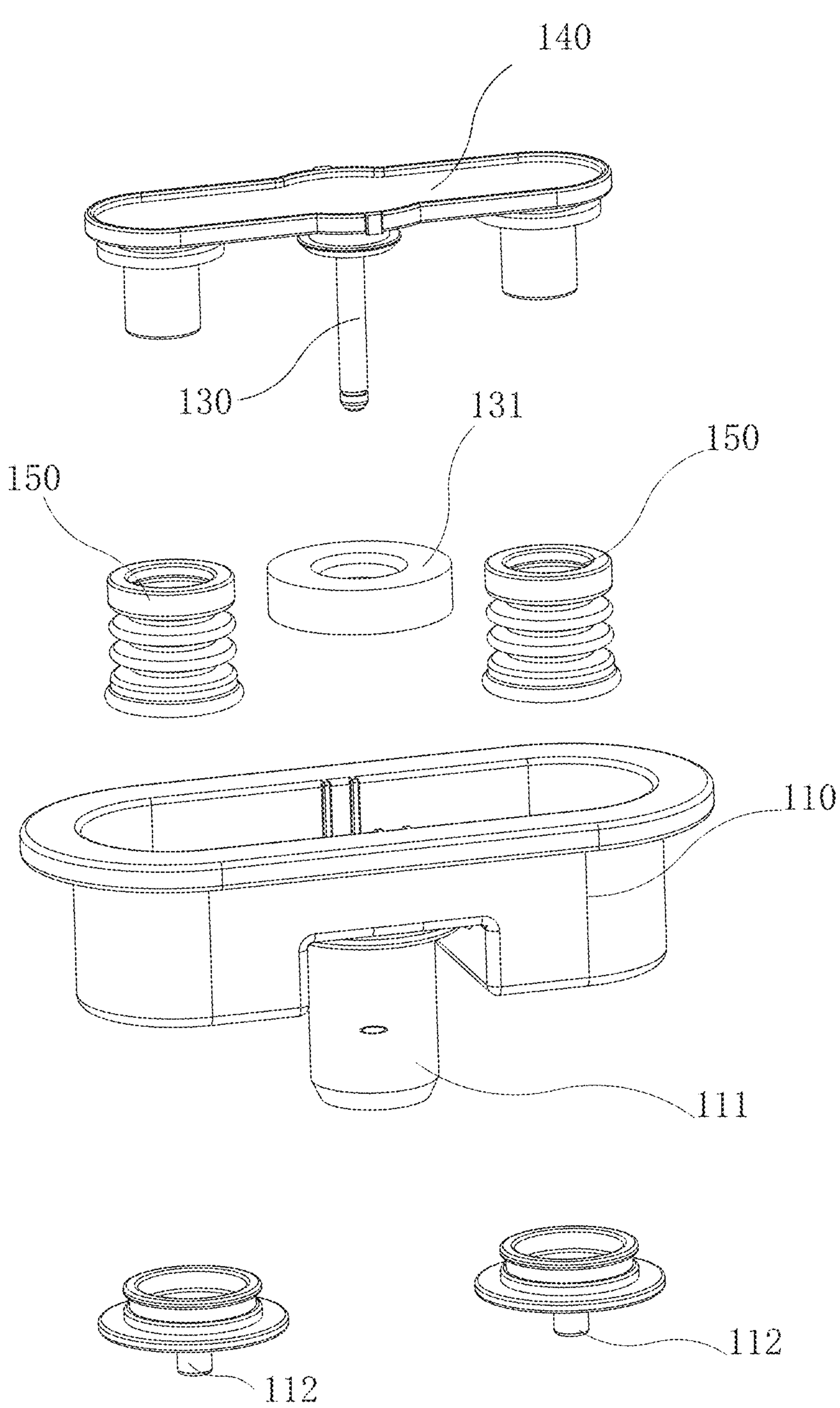
FIG. 10 is an exploded view of a pressure regulating valve structure according to a fourth embodiment of the present disclosure.
Figure 11:
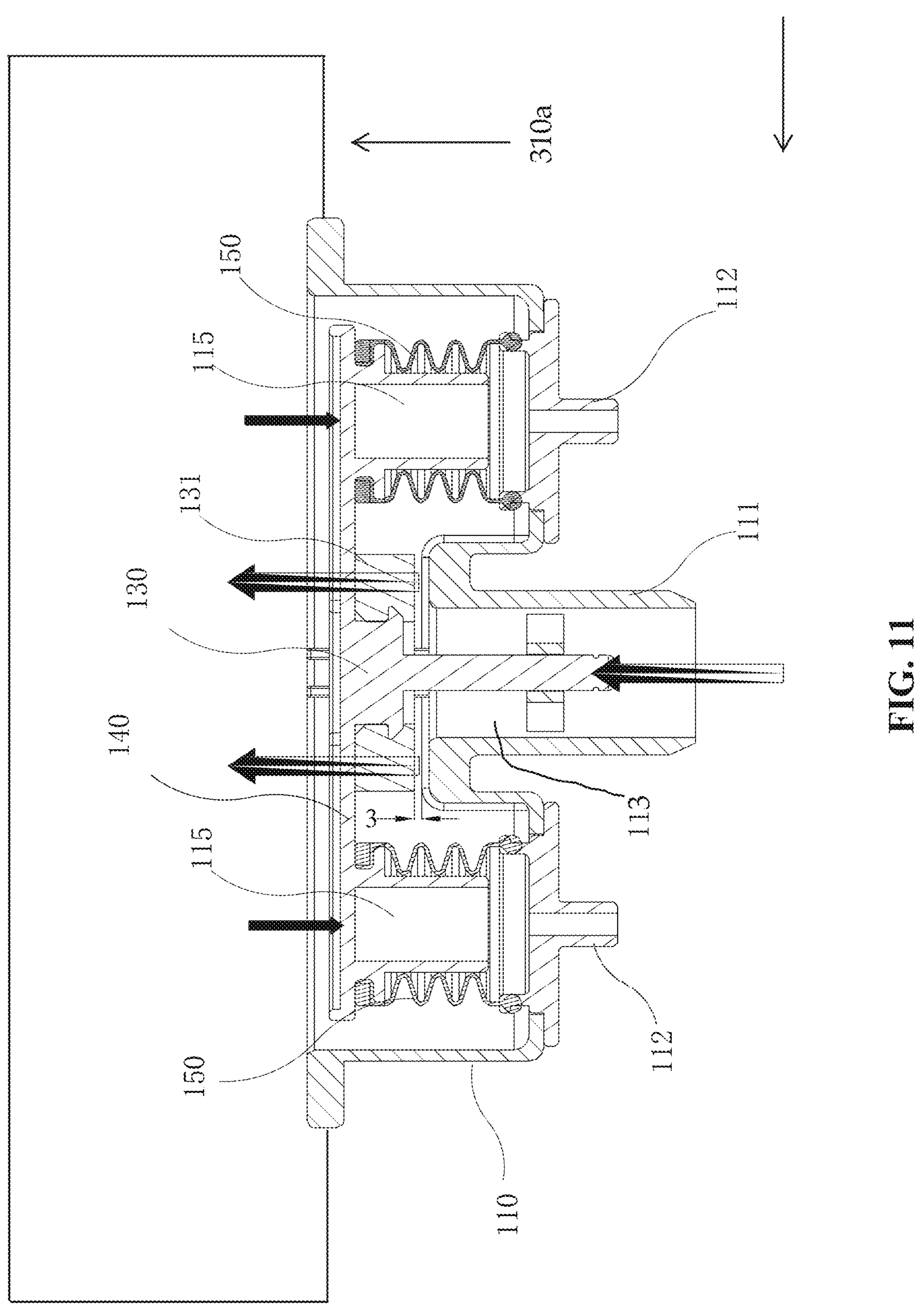
FIG. 11 is a sectional view of the pressure regulating valve structure of FIG. 10, the pressure regulating structure shown on an outer wall of an inflatable chamber.
Figure 12:
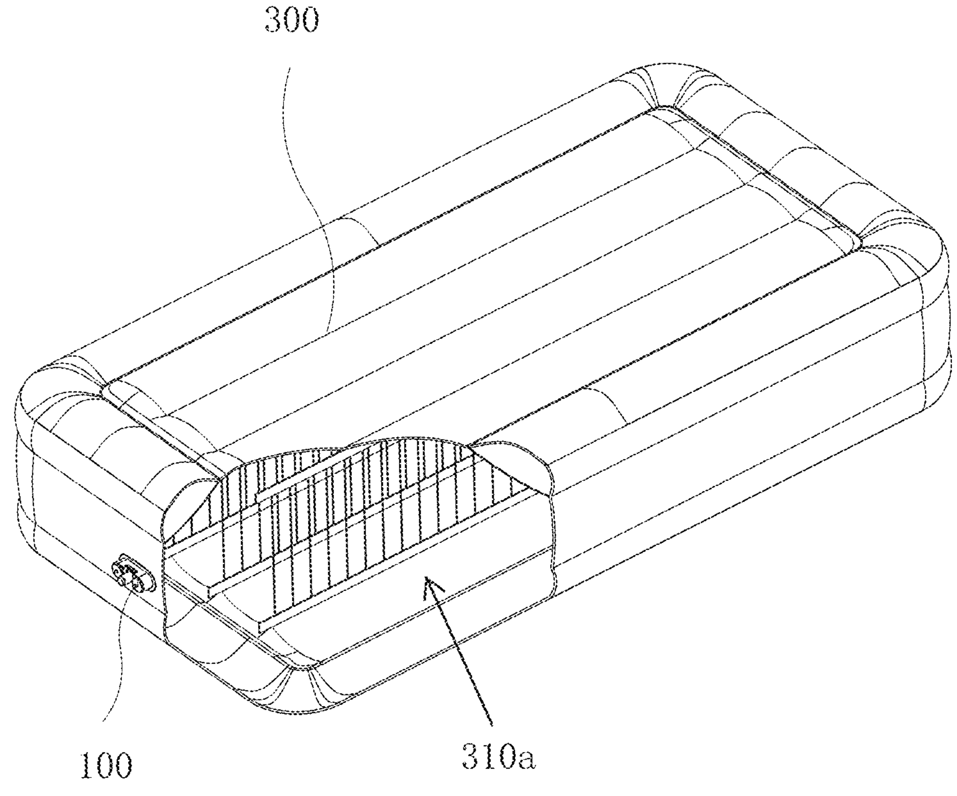
FIG. 12 is a sectional view of the pressure regulating valve structure of FIG. 10, the pressure regulating valve structure shown disposed in an inflatable product.

As shown in FIGS. 10-12, the pressure regulating valve structure comprises a valve body 110, which is provided with a first joint 111 and two second joints 112. An air inlet channel 113 is formed in the valve body 110. Valve body 110 is provided with a valve stem 130. The valve stem 130 is provided with a sealing member 131 for selectively opening or closing the air inlet channel 113. The valve stem 130 is connected to a linkage rod 140, and both ends of the linkage rod 140 are connected to a pressure valve diaphragm 150. The pressure valve diaphragm 150 is further connected with the valve body 110 and is matched with the valve body 110 to form a closed compression space 115, which is connected to the second joint 112.

The pressure regulating valve structure integrates the linkage rod 140 and the valve stem 130 and uses two pressure valve diaphragms 150 to drive the movement of the valve stem 130. To ensure the sealing effect of the sealing member 131 of the valve stem 130 on the air inlet channel 113, the two pressure valve diaphragms 150 in this embodiment are symmetrical with respect to the central axis of the valve stem 130.

Similarly, the regulating valve 100 of this embodiment can be applied to a single-chamber or multiple-chamber inflatable product. As an example, a single-chamber inflatable product 300 that includes the pressure regulating valve 100 is shown.

The regulating valve 100 is installed on the side wall of the inflatable product 300. Two second joints 112 are connected to the external atmosphere, and the first joint 111 is connected to the inflation and deflation ports. When inflating, the external air passes through the gap between the sealing member 131 of the valve stem 130 and the valve body 110 and enters into the internal chamber 310*a* of inflatable product 300. When the inflation pressure with internal chamber 310*a* reaches the desired value, the two pressure valve diaphragms 150 are squeezed within the compression space 115, thus moving the valve stem 130 outward, making the gap 3 between the sealing member 131 and the valve body 110 close, thus stopping the inflation. That is, referencing FIG. 11, as the pressure within internal chamber 310*a* increases, linkage rod 140 is driven rightward against a collective biasing force of the pressure valve diaphragms 150. Once the biasing force of the pressure valve diaphragms 150 is overcome by the pressure inside the internal chamber 310*a*, the gap 3 between the sealing member 131 and the valve body 110 closes.

Of course, it is understood that three or more than three pressure valve diaphragms 150 can further be set on the linkage rod 140 as long as these pressure valve diaphragms 150 are on the same circumference and uniformly set, and the connection point between linkage rod 140 and valve stem 130 is always inside the circumference formed by these pressure valve diaphragms 150, usually on the center of the circle. In embodiments, the three pressure valve diaphragms 150 may be symmetrically positioned about a central axis of the valve stem 130.

In embodiments, the two or more pressure valve diaphragms 150 are arranged at equal intervals about a central longitudinal axis of the valve stem 130 such that a longitudinal axis of each of the pressure valve diaphragms 150 intersects a circle defined by the pressure valve diaphragms 150 and having its center coincident with the central longitudinal axis of the valve stem 130. The connecting point between the linkage rod 140 and the valve stem 130 is located inside the circumference formed by the circle intersecting the longitudinal axis of each of the pressure valve diaphragms 150.

Pressure equals Force divided by Area, e.g., $N/m^2$=Pa. Accordingly, the internal pressure needed to close the valve may be affected by the area of the circle defined by the pressure valve diaphragms, and, thus, the length or width of the linkage arm 140.

The regulating valve 100 is not provided with an air release channel. The inflatable product can be additionally provided with an air release valve according to actual needs. Similarly, the air release channel of regulating valve 100 in Embodiments 1 to 3 can be omitted.

As described herein, valve stem 130 is arranged within the air inlet channel 113, and the valve stem 130 is driven to move by the linkage rod 140 and the pressure valve diaphragm 150, hereby controlling the sealing member 131 on the valve stem 130 to open or close the air inlet channel 113. When the air pressure of the inflatable product 300 does not reach the set value, there is a gap, such as gap 3 in FIG. 11, between the sealing member 131 and the valve body 110. The air pump 200 can directly inflate the inflatable product 300 without overcoming the resistance of the valve body 110, which greatly improves the inflation efficiency, so as to realize the rapid inflation of the inflatable product. When the air pressure of the inflatable product 300 reaches the set value, the pressure valve diaphragm 150 drives the linkage rod 140 to move, and then drives the valve stem 130, so that the sealing member 131 closes the air inlet channel 113, completing the inflation, and performing the function of limiting the pressure of the inflatable product.

Compared with the existing valve structure, an advantage among others is the present embodiments can effectively improve the inflation efficiency of the inflatable product 300 and realize rapid inflation.

EXAMPLES

Example 1: A pressure regulating valve structure may comprise a valve body, an air inlet channel arranged in the valve body, and a valve stem movably arranged in the air inlet channel and configured to open or close the air inlet channel. The air inlet channel may be in an open state under normal conditions. The valve stem may be connected to a linkage rod. The linkage rod may be connected to a pressure valve diaphragm, which may be installed on the valve body. A compression space may be formed between the pressure valve diaphragm and the valve body. The compression space may be connected to an outside of the valve body.

Example 2: The pressure regulating valve structure according to Example 1, wherein a first end of the linkage rod may be hinged on the valve body, and a second end may be connected to the pressure valve diaphragm.

Example 3: The pressure regulating valve structure according to Example 2, wherein the valve stem may be directly connected to the linkage rod.

Example 4: The pressure regulating valve structure according to Example 2, wherein the valve stem may be connected to the linkage rod through an elastic member.

Example 5: The pressure regulating valve structure according to Example 4, wherein the linkage rod may be provided with a rotatable adjusting bolt, a first end of the elastic member may be connected to a valve stem, and a second end may be connected to the adjusting bolt.

Example 6: The pressure regulating valve structure according to Example 1, wherein the pressure valve diaphragm may be fixed on the main body through a fixing member.

Example 7: The pressure regulating valve structure according to Example 1, wherein the linkage rod may be connected to at least two pressure valve diaphragms, and wherein the at least two pressure valve diaphragms may be arranged at equal intervals on the same circumference, and the connecting point between the linkage rod and the valve stem may be located inside the circumference formed by the at least two pressure valve diaphragms.

Example 8: The pressure regulating valve structure according to any of Examples 1-8, wherein the valve body may be provided with a first joint and a second joint, the first joint may be connected to the air inlet channel, and the second joint may be connected to the compression space.

Example 9: The pressure regulating valve structure according to any one of Examples 1-7, wherein the valve stem may be matched with a sealing valve member.

Example 10: The pressure regulating valve structure according to any one of Examples 1-7, wherein the valve body may be further provided with an air outlet channel, and the air outlet channel may be equipped with at least one sealing gasket, wherein, when an air pressure at the inner side of the air channel is higher than an air pressure at the outer side of the air outlet channel, the sealing gasket may open the air outlet channel, and wherein, when the air pressure at the outer side of the air outlet channel is greater than the air pressure at the inner side of the air outlet channel, the sealing gasket may close the air outlet channel, the inner side may be positioned proximate the side of the valve body toward the inflatable product, and the outer side may be positioned opposite the inner side.

Example 11: The pressure regulating valve structure according to Example 10, wherein air outlet channel may be equipped with more than one sealing gasket.

Example 12: The pressure regulating valve structure according to Example 10, wherein the valve body may comprise a main body and an upper cover, and the upper cover and the main body may form the air outlet channel.

Example 13: An inflatable product may comprise the pressure valve structure as described in any one of Examples 1-12, the pressure valve structure may be installed on an outer wall of the inflatable product.

Example 14: The inflatable product according to Example 13, wherein the inflatable product may be a single-chamber inflatable product.

Example 15: The inflatable product according to Example 13, wherein the inflatable product is a multi-chamber inflatable product, and the inflatable product is also equipped with a inflation and deflation component, the inflation and deflation component may be arranged on the outer wall of the inflatable product and connected with one of the chambers, and an outer wall of each respective chamber may be equipped with the pressure control valve structure, the air inlet channel of the pressure control valve structure may be communicated with the inflation and deflation component, and the compression space may be communicated with an outside of the inflatable product.

Example 16: The inflatable product according to Example 15, characterized in that the inflation and deflation components may be inflation and deflation valves or inflation and deflation pumps.

Example 17: A pressure regulating valve structure may comprise a valve body, a linkage rod, a valve stem, and a pressure valve diaphragm. The valve body may comprise an air inlet channel, an air outlet channel, and a compression space fluidly connected to an outside of the valve body. The linkage rod may be pivotally connected to the valve body. The valve stem may be movably positioned within the air inlet channel and connected to the linkage rod. The pressure valve diaphragm may be indirectly connected to the valve stem via the linkage rod and configured to displace within the compression space.

Example 18: The pressure regulating valve structure according to Example 17, wherein the valve stem may be in an open position within the air inlet channel under normal condition.

Example 19: The pressure regulating valve structure according to Example 17 may further comprise an elastic member. The elastic member may be positioned between the valve stem and the linkage rod such that the valve stem is indirectly connected to the linkage rod via the elastic member.

Example 20: The pressure valve diaphragm structure according to Example 19, wherein the linkage rod may further comprise an adjusting bolt, a first end of the elastic member may be connected to the valve stem, and a second end of the elastic member may be connected to the adjusting bolt.

Example 21: The pressure valve diaphragm structure according to Example 17, wherein the linkage rod may comprise a first end and a second end, the linkage rod may be pivotally connected to the valve body proximate the first end, and the pressure valve diaphragm may be connected to the linkage rod proximate the second end.

Example 22: A pressure regulating valve structure may comprise a valve body, a linkage rod, a valve stem, and a plurality of pressure valve diaphragms. The valve body may comprise an air inlet channel, an air outlet channel, and a plurality of compression spaces fluidly connected to an outside of the valve body. The linkage rod may be movably connected to the valve body. The valve stem may be movably positioned within the air inlet channel and connected to the linkage rod. The plurality of pressure valve diaphragms may be connected to the linkage rod, and each of the plurality of pressure valve diaphragms may be positioned within a respective compression space of the plurality of compression spaces. The plurality of pressure valve diaphragms may collectively define a circumference having a central longitudinal axis coincident with a longitudinal axis of the valve stem.

Example 23: The pressure regulating valve structure according to Example 20, wherein the plurality of pressure valve diaphragms may be arranged at equal intervals about the circumference.

REFERENCE MARKS

Regulating valve 100;
Valve body 110;
First joint 111;
Second joint 112;
Air inlet passage 113;
Air outlet channel 114;
Compression space 115;
Main body 117;
Upper cover 116;
Gasket 120;
Large gasket 121;
Small gasket 122;
Valve rod 130;
Sealing member 131;
Linkage rod 140;
Pressure valve diaphragm 150;
Fixing member 151;
Elastic member 160;
Adjusting bolt 170;
Air pump 200;
Inflatable product 300;
Inner chamber 310;

Inner chamber 310*a;*
Outer chamber 320;
Gap 3;
First joint conduit 4;
Second joint conduit 6.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A pressure regulating valve structure comprising:
a valve body,
an air inlet channel arranged in the valve body, and
a valve stem movably arranged in the air inlet channel and configured to open or close the air inlet channel,
wherein the air inlet channel is in an open state under normal conditions,
wherein the valve stem is connected to a linkage rod, and
wherein the linkage rod is connected to a pressure valve diaphragm, the pressure valve diaphragm is installed on the valve body, and a closed compression space is formed between the pressure valve diaphragm and the valve body, and the closed compression space is connected to an outside of the valve body.

2. The pressure regulating valve structure according to claim 1, wherein a first end of the linkage rod is hinged on the valve body, and a second end of the linkage rod is connected to the pressure valve diaphragm.

3. The pressure regulating valve structure according to claim 2, wherein the valve stem is directly connected to the linkage rod.

4. The pressure regulating valve structure according to claim 2, wherein the valve stem is connected to the linkage rod through an elastic member.

5. The pressure regulating valve structure according to claim 4, wherein the linkage rod is provided with a rotatable adjusting bolt, a first end of the elastic member is connected to the valve stem, and a second end of the elastic member is connected to the rotatable adjusting bolt.

6. The pressure regulating valve structure according to claim 1, wherein the pressure valve diaphragm is fixed on the valve body through a fixing member.

7. The pressure regulating valve structure according to claim 1, wherein the linkage rod is connected to at least two pressure valve diaphragms, and wherein the at least two pressure valve diaphragms are arranged at equal intervals on a same circumference, and a connecting point between the linkage rod and the valve stem is located inside the circumference formed by the at least two pressure valve diaphragms.

8. The pressure regulating valve structure according to claim 1, wherein the valve body is provided with a first joint and a second joint, the first joint is connected to the air inlet channel, and the second joint is connected to the closed compression space.

9. The pressure regulating valve structure according to claim 1, wherein the valve stem is matched with a sealing valve member.

10. The pressure regulating valve structure according to claim 1, wherein the valve body is further provided with an air outlet channel comprising an inner side positioned proximate a side of the valve body toward an inflatable product, and an outer side positioned opposite the inner side, the air outlet channel is further equipped with at least one sealing gasket, wherein, when an air pressure at the inner side of the air outlet channel is greater than an air pressure at the outer side of the air outlet channel, the sealing gasket opens the air outlet channel, and wherein, when the air pressure at the outer side of the air outlet channel is greater than the air pressure at the inner side of the air outlet channel, the sealing gasket closes the air outlet channel.

11. The pressure regulating valve structure according to claim 10, wherein the air outlet channel is equipped with more than one sealing gasket.

12. The pressure regulating valve structure according to claim 10, wherein the valve body comprises a main body and an upper cover, and the upper cover and the main body form the air outlet channel.

13. An inflatable product comprising the pressure regulating valve structure as described in claim 1, the pressure regulating valve structure being installed on an outer wall of the inflatable product.

14. The inflatable product according to claim 13, wherein the inflatable product is a single chamber inflatable product.

15. The inflatable product according to claim 13, wherein the inflatable product is a multi-chamber inflatable product, and the inflatable product is also equipped with a inflation and deflation component, the inflation and deflation component is arranged on the outer wall of the inflatable product and connected with one of the chambers, and an outer wall of each respective chamber is equipped with the pressure control valve structure, the air inlet channel of the pressure control valve structure is communicated with the inflation and deflation component, and the closed compression space is communicated with an outside of the inflatable product.

16. The inflatable product according to claim 15, wherein the inflation and deflation component is an inflation and deflation valve or an inflation and deflation pump.

17. A pressure regulating valve structure, comprising:
a valve body comprising:
an air inlet channel,
an air outlet channel, and
a compression space fluidly connected to an outside of the valve body;
a linkage rod pivotally connected to the valve body,
a valve stem movably positioned within the air inlet channel and connected to the linkage rod, the valve stem equipped with a seal configured to open and close the air inlet channel, and
a pressure valve diaphragm indirectly connected to the valve stem via the linkage rod and configured to displace within the compression space,
wherein an airflow from the air outlet channel through the air inlet channel circumvents the seal.

18. The pressure regulating valve structure of claim 17, wherein the valve stem is in an open position within the air inlet channel under a normal condition.

19. The pressure regulating valve structure of claim 17, further comprising an elastic member, the elastic member positioned between the valve stem and the linkage rod such that the valve stem is indirectly connected to the linkage rod via the elastic member.

20. The pressure regulating valve diaphragm structure of claim 19, wherein the linkage rod further comprises an adjusting bolt, a first end of the elastic member is connected to the valve stem, and a second end of the elastic member is connected to the adjusting bolt.

21. The pressure regulating valve structure of claim 17, wherein the linkage rod comprises a first end and a second end, the linkage rod is pivotally connected to the valve body proximate the first end, and the pressure valve diaphragm is connected to the linkage rod proximate the second end.

22. The pressure regulating valve structure according to claim 17, wherein a first end of the linkage rod is hinged on the valve body, and a second end of the linkage rod is connected to the pressure valve diaphragm.

23. The pressure regulating valve structure according to claim 22, wherein the valve stem is connected to the linkage rod through an elastic member.

24. The pressure regulating valve structure according to claim 23, wherein the linkage rod is provided with a rotatable adjusting bolt, a first end of the elastic member is connected to the valve stem, and a second end of the elastic member is connected to the rotatable adjusting bolt.

25. The pressure regulating valve structure according to claim 17, wherein the pressure valve diaphragm is fixed on the valve body through a fixing member.

26. The pressure regulating valve structure according to claim 17, wherein the valve body is provided with a first joint and a second joint, the first joint is connected to the air inlet channel, and the second joint is connected to the compression space.

27. The pressure regulating valve structure according to claim 17, wherein the valve body comprises a main body and an upper cover, and the upper cover and the main body form the air outlet channel.

28. A pressure regulating valve structure, comprising:

a valve body comprising:

an air inlet channel, an air outlet channel, and a plurality of compression spaces fluidly connected to an outside of the valve body;

a linkage rod movably connected to the valve body, a valve stem movably positioned within the air inlet channel and connected to the linkage rod, and a plurality of pressure valve diaphragms connected to the linkage rod, each of the plurality of pressure valve diaphragms positioned within a respective compression space of the plurality of compression spaces, wherein the plurality of pressure valve diaphragms collectively define a circumference having a central longitudinal axis coincident with a longitudinal axis of the valve stem.

29. The pressure regulating valve structure of claim 28, wherein the plurality of pressure valve diaphragms are arranged at equal intervals about the circumference.

30. The pressure regulating valve structure according to claim 28, further comprising a first joint connected to the air inlet channel and a plurality of second joints, each of the plurality of second joints connected to a corresponding compression space of the plurality of compression spaces.

31. The pressure regulating valve structure according to claim 28, wherein the valve stem is equipped with a seal configured to open and close the air inlet channel.

32. The pressure regulating valve structure according to claim 28, wherein the pressure regulating valve structure is installed on a sidewall of an inflatable product.

33. A pressure regulating valve structure, comprising:

a valve body comprising:

an air inlet channel, an air outlet channel, and a compression space fluidly connected to an outside of the valve body;

a linkage rod pivotally connected to the valve body, a valve stem movably positioned within the air inlet channel and connected to the linkage rod, a pressure valve diaphragm indirectly connected to the valve stem via the linkage rod and configured to displace within the compression space, and an elastic member, the elastic member positioned between the valve stem and the linkage rod such that the valve stem is indirectly connected to the linkage rod via the elastic member.

34. The pressure regulating valve structure according to claim 33, wherein the linkage rod further comprises an adjusting bolt, a first end of the elastic member is connected to the valve stem, and a second end of the elastic member is connected to the adjusting bolt.

35. The pressure regulating valve structure according to claim 33, wherein the valve stem is in an open position within the air inlet channel under a normal condition.

36. The pressure regulating valve structure according to claim 33, wherein the pressure valve diaphragm is fixed on the valve body through a fixing member.

37. The pressure regulating valve structure according to claim 33, wherein the valve body is provided with a first joint and a second joint, the first joint is connected to the air inlet channel, and the second joint is connected to the compression space.

38. The pressure regulating valve structure according to claim 33, wherein the valve body comprises a main body and an upper cover, and the upper cover and the main body form the air outlet channel.

* * * * *